Patented May 21, 1940

2,201,259

UNITED STATES PATENT OFFICE 2,201,259

FRACTIONATION OF CHLORINATED KETONES BY STEAM DISTILLATION

Albert E. Calkins, Akron, Ohio, assignor to The B. F. Goodrich Company, New York, N. Y., a corporation of New York No Drawing. Application December 30, 1937, Serial No. 182,518

4 Claims. (Cl. 202—46)

This invention relates to chlorinated ketones, and has as its object to provide a method whereby they may be fractionated without pyrolysis or hydrolysis.

Though monochlorinated ketones are very useful intermediates in chemical syntheses, in many reactions such as the preparation of thiazoles they must be quite pure to react satisfactorily. When ketones are chlorinated, varying proportions of polychlorinated by-products are always produced. Separation of the monochlorinated product or isomers from the mixture by ordinary methods of distillation is very unsatisfactory because of the great amount of pyrolysis which occurs, causing both low yields and heavy deposits of carbon on distillation equipment.

It is well known that chlorinated ketones are readily hydrolyzed. Since they are preferably prepared in the absence of moisture, it would seem that steam distillation of these highly reactive compounds would be impractical. It is not surprising, therefore, that low yields of distillate are obtained when external heat is applied to a mixture of chloroketones and water.

I have discovered, however, that when steam is injected into a crude chloroketone mixture, the products distill with no pyrolysis or hydrolysis. I have furthermore discovered that the isomers can be separated more effectively by steam distillation than is possible by ordinary distillation methods.

As a specific embodiment of the method of my invention, I will illustrate its application to the product obtained by chlorinating 2-butanone, though it is to be understood that the method is equally applicable to other chloroketones. The product obtained by chlorinating 2-butanone is essentially a mixture of 1-chloro- and 3-chloro-2 butanones containing some higher boiling polychlorobutanones and sometimes some unconverted ketone. The crude reaction product is placed in a distillation vessel, and live steam is passed through the mixture. The distillation is continued until the gravity of the chloroketone being distilled from the flask is about 1.12. The residue in the flask consists essentially of the higher boiling polychloroketones, and the distillate consists essentially of the monochlorinated isomers. No pyrolysis accompanies this distillation, and the residue is an oil which may be easily removed from the distillation vessel. Any former method of distillation leaves the vessel contaminated with a difficulty removable deposit of tar and carbon.

A further advantage of my invention resides in the fact that even the monochlorinated isomers may be separated by steam distillation. A typical crude chlorinated 2-butanone comprises

| | Per cent |
|---|---|
| 3-chloro-2 butanone | 58 |
| 1-chlor-2 butanone | 27 |
| Polychloro 2 butanones | 15 |

When this mixture is distilled by steam introduced from an outside source, the following fractions may be successively collected:

| | Per cent |
|---|---|
| 3-chloro-2 butanone | 50 |
| Mixture of monochlorobutanones | 15 |
| 1-chlor-2-butanone | 20 |

The 15% of polychlorobutanones is left in the distilling vessel. The 50% of 3-chloro-2-butanone is about 95% pure, and is obtained in higher yields than by other methods. Either the specific gravity of the distillate or the volume of material which has distilled may be used to determine when the distillation of one component has proceeded far enough.

The steam used in the distillation may be supplied at any desired temperature. It is usually supplied at some positive pressure, although it may be supplied at a negative pressure if desired. For a chlorobutanone distillation, a pressure of from 10 to 90 lbs./sq. in. absolute is satisfactory, at which pressures the temperature varies from about 90° to 160° C. Higher or lower pressures may be employed, however, if desired.

Although I have herein disclosed specific embodiments of my invention, I do not desire to limit myself solely thereto, for many modifications are within the spirit and scope of the appended claims.

I claim:

1. The method of separating a mixture of monochloro- and polychloro-2-butanones which comprises injecting steam from an outside source into the mixture and collecting the distillate until substantially all of the monochlorinated product has distilled.

2. The method of fractionally distilling the mixture of chlorobutanones obtained by chlorinating 2-butanone which comprises injecting steam from an outside source into the mixture until substantially all of the monochlorinated products have distilled, and collecting a first fraction of the distillate being chiefly 3-chloro-2-butanone, and collecting a last portion of the distillate being chiefly 1-chloro-2-butanone.

3. The method of separating a mixture of monochloro- and polychloro-2-butanones which comprises injecting steam heated to a temperature of from 90° to 160° C. from an outside source into the mixture and collecting the distillate until substantially all of the monochlorinated product has distilled.

4. The method of fractionally distilling the mixture of chlorobutanones obtained by chlorinating 2-butanone which comprises injecting steam heated to a temperature of from 90° to 160° C. from an outside source into the mixture until substantially all of the monochlorinated products have distilled, and collecting a first fraction of the distillate being chiefly 3-chloro-2-butanone, and collecting a last portion of the distillate being chiefly 1-chloro-2-butanone.

ALBERT E. CALKINS.